Patented May 29, 1923.

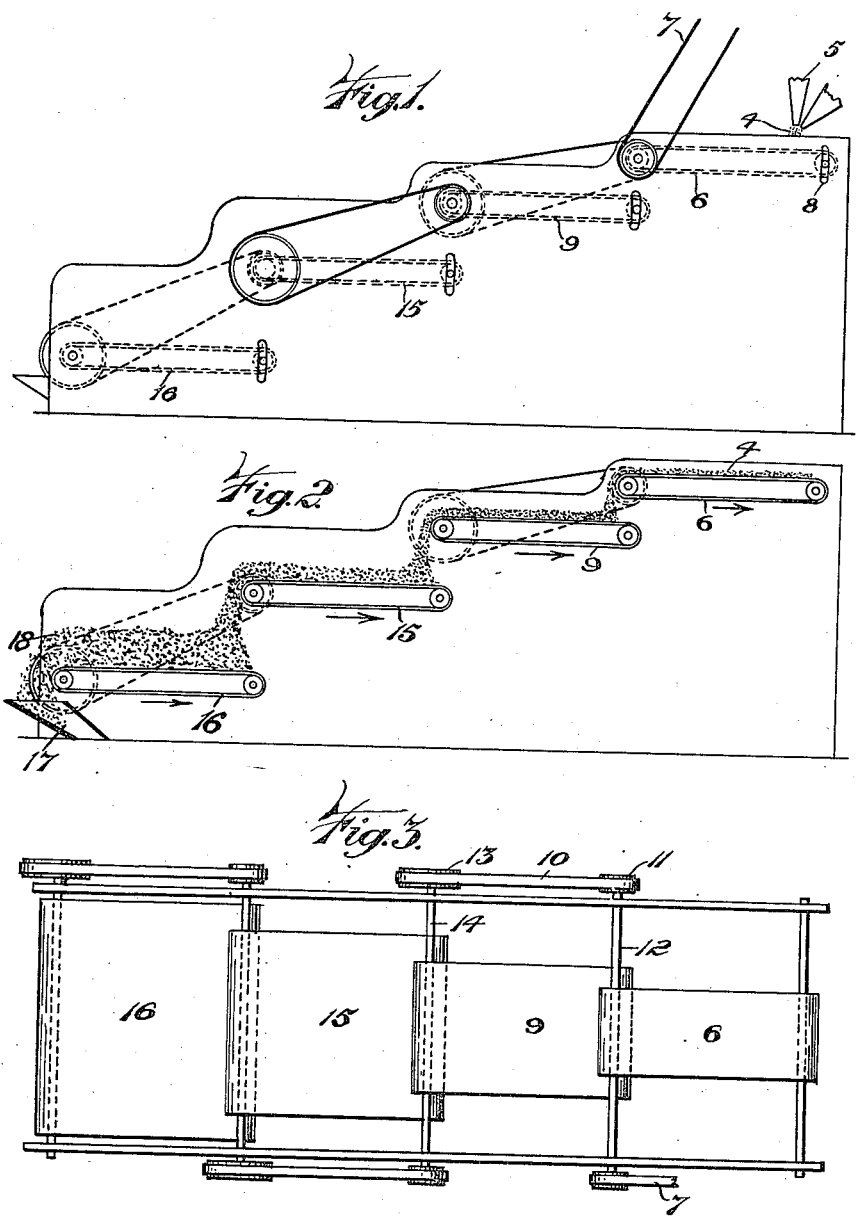

1,456,858

UNITED STATES PATENT OFFICE.

THOMAS OTWAY PARTRIDGE, OF NORTH SYDNEY, NEW SOUTH WALES, AUSTRALIA.

APPARATUS FOR MIXING DRY MATERIALS.

Application filed December 16, 1922. Serial No. 607,446.

*To all whom it may concern:*

Be it known that I, THOMAS OTWAY PARTRIDGE, a subject of the King of Great Britain and Ireland, residing at St. Leonards, North Sydney, in the State of New South Wales, Commonwealth of Australia, have invented certain new and useful Improvements in Apparatus for Mixing Dry Materials, of which the following is a specification.

This invention relates to an apparatus whereby the dry ingredients used in the manufacture of many commercial substances may be easily and intimately mixed. The apparatus is more especially applicable to processes where the bulk of the ingredients is large as in brickworks, cement works, and the like, but it may be as successfully used for mixing and blending tea or coffee or other similar materials.

The object of the invention is to provide a means of mechanically mixing dry or semi-dry material which is continuous and automatic and which does not require any complicated machinery or consume excessive power as in suitable cases gravity may be used to advantage.

The invention comprises a series of conveyor belts arranged to discharge from one to the other in rotation each successive belt running at a reduced speed to the preceding one. The width of each belt varies inversely as its speed. The belts may be arranged in any convenient manner either stepped end to end with all the belts travelling in the same direction or each alternate one travelling in the reverse direction or along the sides of a hollow, square or in a zig zag direction or a combination of any or all of the above arrangements, the essential being that each belt delivers the material thereon to an underlying belt that is travelling at a reduced speed. Means for altering the inclination of and for driving each belt at a different speed are provided so that when materials of a high specific gravity are being mixed the belts may be inclined down towards the delivery end to utilize gravity to save power and conversely for light materials so that they may be further mixed by the tendency for the material to roll back down the belt.

For mixing materials of widely different specific gravity the belts would be run in a horizontal position to avoid the natural tendency towards separation.

One simple means for carrying out the invention is illustrated in the accompanying drawings which are diagrammatic and in which:—

Figure 1 is a side elevation of an arrangement of four belts end to end.

Figure 2 is a sectional side elevation of same.

Figure 3 is a plan of same.

The dry materials 4, to be mixed are fed by any well known and suitable means such as from hoppers 5 onto the first or upper belt 6 which is moving at a moderate speed in the direction shown by the arrows. This belt is operated from its forward end in any well known way such as by a pulley and belt drive 7 and is adapted to be inclined by lowering or raising the rear end in a radial slot 8 or by any other means.

The forward end of the belt 6 overlaps an underlying belt 9 which is of a slightly greater width and is running in the same direction at a slower speed. This belt is driven from the forward end by a suitable arrangement such as a belt 10 from a pulley 11 on the driving shaft 12 of the previous belt to a pulley 13 on the driving shaft 14 of the second conveyor belt 9. This arrangement may be replaced by any other method which will ensure that the rates between the speeds of the conveyor belts 6 and 9 is constant.

A third conveyor belt 15 underlies the second belt 9. This belt 15 is driven at a slower speed and is wider than belt 9. The ratio between the speeds of belts 9 and 15 is also kept constant by any suitable means.

A fourth conveyor belt 16 underlies beyond the third belt 15 and is driven in a similar manner. This belt 16 is also wider and driven at a slower speed than belt 15. Suitably positioned under the end of belt 16 is a hopper 17 which receives and delivers the mixed material 18 to the next process.

In operation—the material 4 is fed from hoppers 5 in the right proportions and roughly mixed by falling on the upper part of the first conveyor belt which is moving as shown in Figure 2. As the belt moves forward the material forms a layer and on reaching the forward end the material falls vertically onto the next belt 9 which is moving at a slower rate, e. g., the ratio between the speeds of successive belts may be 2 to 1. The effect of the transfer from belt to belt is that any two particles of the material which may have been lying one above the other on the first belt would now be lying side by side on the second belt and if the speed ratio is 2 to 1 the quantity per unit length on the second belt would be double that on the first belt.

The material is then moved along and dumped onto the third belt where the relative position of the particles is again changed and where the quantity per unit length is again doubled.

On arriving on the fourth belt which is still further decreased in speed and increased in width the material is disturbed again and ultimately falls into the receiving hopper 17. In practice the belts would be arranged as found most suitable for the location and as well as acting as mixers would be of use in conveying the materials from floor to floor or from machine to machine in a factory.

The length of the belts is immaterial and need only be sufficient to receive and deliver the material unless governed by other considerations such as the distance to or from the points of delivery and discharge.

The capacity of the machine is governed by the speed and width of the belts and for a given capacity and constant speed ratio between successive belts the width of the belts would have to be increased so that the product of the speed and the area of material conveyed would be constant at every point.

For example:—For a constant speed ratio of 2 to 1 between belts a speed of 64 feet per minute and width of 6 inches for the first belt and angle of repose of material of 45 degrees the following widths of successive belts would be necessary.

Capacity of first belt per foot run 108 c. inches, i. e., 6912 cub. ins. per minute.

|  | Speed. | Capacity. | Width. |
|---|---|---|---|
|  | Ft./min. | C. in./min. | Ins. |
| Second belt | 32 | 6912 | 8½ |
| Third | 16 | 6912 | 12 |
| Fourth | 8 | 6912 | 17 | and so on.

The belt speed ratio may be altered by any well known means according to the material to be mixed.

Provided the width of the belts is sufficient the speed ratio between each successive pair of belts need not be the same, e. g., the first ratio may be 2 to 1, the second 3 to 2, and so on using speeds and speed ratios which would be most suitable for the quantity and quality of the material to be mixed.

I claim:—

1. An apparatus for mixing dry materials comprising a series of conveyor belts arranged to discharge from one to the other in rotation, each successive belt being wider than the preceding one, and means for driving the belts at successively reduced speeds.

2. An apparatus for mixing dry materials comprising a series of conveyor belts arranged to discharge from one to the other in rotation, the width of each successive belt varying inversely to its speed and means for driving the belts at successively reduced speeds.

In testimony whereof he has affixed his signature in presence of two witnesses.

THOMAS OTWAY PARTRIDGE.

Witnesses:
T. C. ALLEN, Jr.,
N. M. GODDARD.